(12) United States Patent
Staser et al.

(10) Patent No.: US 7,882,658 B2
(45) Date of Patent: Feb. 8, 2011

(54) CABLE REGULATOR RAIL AND CARRIER WITH SNAP-IN PULLEY

(75) Inventors: Brian H. Staser, Oxford, MI (US); Mike J. Skiba, Sterling Heights, MI (US); Timothy A. Neil, Holly, MI (US)

(73) Assignee: Inteva Products LLC., Troy, MI (US)

( * ) Notice: Subject to any disclaimer, the term of this patent is extended or adjusted under 35 U.S.C. 154(b) by 405 days.

(21) Appl. No.: 12/046,933

(22) Filed: Mar. 12, 2008

(65) Prior Publication Data

US 2008/0222962 A1 Sep. 18, 2008

Related U.S. Application Data

(60) Provisional application No. 60/906,798, filed on Mar. 13, 2007.

(51) Int. Cl.
*E05F 11/48* (2006.01)
(52) U.S. Cl. ........................................ 49/352
(58) Field of Classification Search ............ 49/349, 49/350, 351, 352, 502
See application file for complete search history.

(56) References Cited

U.S. PATENT DOCUMENTS

| | | | | |
|---|---|---|---|---|
| 5,074,077 | A * | 12/1991 | Toyoshima et al. | 49/352 |
| 6,516,493 | B1 | 2/2003 | Seliger et al. | |
| 6,571,515 | B1 * | 6/2003 | Samways et al. | 49/502 |
| 6,640,500 | B1 * | 11/2003 | Stout | 49/502 |
| 6,688,043 | B1 * | 2/2004 | Feder et al. | 49/352 |
| 6,874,279 | B1 * | 4/2005 | Weber et al. | 49/352 |
| 6,910,730 | B2 * | 6/2005 | Kinoshita et al. | 296/146.16 |
| 7,076,918 | B2 * | 7/2006 | Tatsumi et al. | 49/352 |
| 7,121,044 | B2 * | 10/2006 | Santaolalla et al. | 49/352 |
| 7,246,465 | B2 | 7/2007 | Staser | |
| 7,263,804 | B2 * | 9/2007 | Ishii et al. | 49/352 |
| 7,596,908 | B2 * | 10/2009 | Rothe et al. | 49/374 |
| 2002/0046498 | A1 * | 4/2002 | Cardine | 49/352 |
| 2002/0139051 | A1 * | 10/2002 | Arquevaux et al. | 49/352 |
| 2003/0066244 | A1 * | 4/2003 | Staser et al. | 49/375 |

(Continued)

FOREIGN PATENT DOCUMENTS

GB 2083132 A * 3/1982

(Continued)

OTHER PUBLICATIONS

International Search Report dated Jul. 15, 2008, International Application No. PCT/US2008/056639.

(Continued)

*Primary Examiner*—Jerry Redman
(74) *Attorney, Agent, or Firm*—Cantor Colburn LLP (57) ABSTRACT

Exemplary embodiments of the present invention are directed towards improved mounting structures and methods for formation of window regulator systems for vehicles. In one exemplary embodiment, a mounting structure for a window regulator system is provided. The mounting structure includes a main body defining cavity for rotatably receiving a portion of a pulley; and an engagement feature depending away from the main body, the engagement feature engaging the portion of the pulley and preventing movement of the pulley away from the main body, the engagement feature being substantially free of fasteners for preventing movement of the portion of the pulley away from the main body.

11 Claims, 8 Drawing Sheets

U.S. PATENT DOCUMENTS

| | | | |
|---|---|---|---|
| 2004/0237410 A1* | 12/2004 | Cardine et al. | 49/352 |
| 2005/0016071 A1* | 1/2005 | Takeda et al. | 49/352 |
| 2006/0037247 A1 | 2/2006 | Heyer et al. | |
| 2006/0174542 A1* | 8/2006 | Bernard et al. | 49/352 |
| 2006/0196122 A1 | 9/2006 | Urieta et al. | |
| 2007/0017159 A1* | 1/2007 | Moore | 49/502 |
| 2007/0044382 A1* | 3/2007 | Moriyama et al. | 49/352 |
| 2007/0163178 A1 | 7/2007 | Lefevre et al. | |
| 2007/0199246 A1* | 8/2007 | Renke et al. | 49/352 |
| 2007/0214726 A1* | 9/2007 | Graf et al. | 49/352 |
| 2008/0005971 A1* | 1/2008 | Dickie et al. | 49/349 |
| 2008/0098655 A1* | 5/2008 | Valentage | 49/352 |
| 2009/0145035 A1* | 6/2009 | Mangold et al. | 49/352 |

FOREIGN PATENT DOCUMENTS

| | | |
|---|---|---|
| KR | 10-2001-0072494 | 2/2003 |
| KR | 20-0372419 | 1/2005 |
| KR | 10-2006-0050517 | 5/2006 |

OTHER PUBLICATIONS

Written Opinion of International Searching Authority dated Jul. 15, 2008, International Application No. PCT/US2008/056639.

* cited by examiner

CABLE REGULATOR RAIL AND CARRIER WITH SNAP-IN PULLEY

CLAIM OF PRIORITY

This application claims the benefit of U.S. Patent Application Ser. No. 60/906,798, filed Mar. 13, 2007, the contents of which are incorporated herein by reference thereto.

FIELD OF THE INVENTION

Exemplary embodiments of the present invention are directed towards improved mounting structures and methods for formation and attachment of window regulator systems to a vehicle.

BACKGROUND

Actuation of windows, such as vehicle windows, often utilizes window regulator systems for controlling vertical movement. In one configuration, such window regulator systems include one or more window attachments each slidably engaging a vertically orientated guide rail. The window attachment also includes an attachment feature for attachment of the window to the window attachment and hence the vertically orientated guide rail. The window attachment is attached to a drive means, such as a cable, which is driven by a drum motor. In operation, as the drum motor rotates it engages the cable causing movement of the cable and window attachment along the guide rails. This in turn causes movement of the window in a direction parallel to the guide rail, e.g., vertical movement.

Rotational support of the cable is often achieved through the use of one or more carrier pulley systems located on end portions of the guide rails. The carrier pulley systems act to support the cable during movement of the cable and limits friction force and abrasion between the cable and the carrier pulley system. The carrier pulley system includes a pulley configured to guide the cable about a center of the pulley. As the cable moves, the cable travels along a peripheral groove of the one or more pulleys to cause vertical movement of the window attachment and hence window.

However, while this configuration is available, such configuration includes disadvantages in the overall weight, complexity and/or cost of the window regulator system. For example, similar systems typically include carrier pulley systems formed of stamped and/or welded metal members. These systems include one or more fasteners, e.g., bolts, rivets or otherwise, for attachment of the pulley to the carrier pulley system. Not only is the production of this system time consuming, it may also add considerable weight to the overall window regulator system. Yet another disadvantage is in the attachment of the window regulator system to a structure of the vehicle, such as vehicle door or otherwise. In prior configurations, it is necessary to separately mount the pulley system to the guide rails, typically through fasteners, and mount the pulley systems and guide rails to the structure of the vehicle.

SUMMARY OF THE INVENTION

Exemplary embodiments of the present invention provide improvements in the formation and mounting of window regulator systems.

In one exemplary embodiment, a mounting structure for a window regulator system is provided. The mounting structure includes a main body defining cavity for rotatably receiving a portion of a pulley; and an engagement feature depending away from the main body, the engagement feature engaging the portion of the pulley and preventing movement of the pulley away from the main body, the engagement feature being substantially free of fasteners for preventing movement of the portion of the pulley away from the main body.

In another exemplary embodiment, a mounting assembly for a window regulator system is provided. The mounting assembly includes a first mounting structure having a first slotted portion and a first engagement feature formed with the first slotted portion, the first engagement feature being configured to frictionally engage a first pulley for receiving and maintaining position of the first pulley with respect to the first mounting structure. The mounting assembly further includes a second mounting structure having a second slotted portion and a second engagement feature formed with the second slotted portion, the second engagement feature being configured to frictionally engage a second pulley for receiving and maintaining position of the second pulley with respect to the second mounting structure. The mounting structure further includes a first guide rail extending between the first mounting structure and the second mounting structure. The first guide rail includes a first window attachment slidably attached thereto. The first window attachment being drivably attached to a cable which is adapted for engagement with the first and second pulleys.

Optionally, the mounting assembly further includes a third mounting structure having a third slotted portion and a third engagement feature formed with the third slotted portion, the third engagement feature being configured to frictionally engage a third pulley for receiving and maintaining position of the third pulley with respect to the third mounting structure. The mounting assembly may also further include a fourth mounting structure having a fourth slotted portion and a fourth engagement feature formed with the fourth slotted portion, the fourth engagement feature being configured to frictionally engage a fourth pulley for receiving and maintaining position of the fourth pulley with respect to the fourth mounting structure. Still further, the mounting structure may includes a second guide rail extending between the third mounting structure and the fourth mounting structure, the second guide rail including a second window attachment slidably attached thereto, the second window attachment being drivably attached to the cable which is adapted for further engagement with the third and fourth pulleys.

In yet another exemplary embodiment, a method of forming a mounting structure for a window regulator system is provided. The method includes the step of inserting a first pulley into a first slotted portion of a first mounting structure and inserting a second pulley into a second slotted portion of a second mounting structure. The first slotted portion includes a first engagement feature and the second slotted portion includes a second engagement feature. The first and second slotted portions resist movement of the first and second pulleys away from the first and second mounting structures, respectively. The method also includes attaching the first and second mounting structures to a first guide rail. At least one of the first and second mounting structures or the first guide rail is configured for attachment to a panel of a vehicle door assembly.

Optionally, the method also comprises the step of inserting a third pulley into a third slotted portion of a third mounting structure and inserting a fourth pulley into a fourth slotted portion of a fourth mounting structure. The third slotted portion includes a third engagement feature and the fourth slotted portion includes a fourth engagement feature. The first and fourth engagement features resist movement of the third and fourth pulleys away from the third and fourth mounting structures, respectively. The method further includes attaching the third and fourth mounting structures to a second guide rail. At least one of the third and fourth mounting structures or the second guide rail is attached to the panel of the vehicle door assembly.

The above-described and other features and advantages will be appreciated and understood by those skilled in the art from the following detailed description, drawings, and appended claims.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Exemplary embodiments of the present invention provide improved mounting structures and methods for formation and attachment of window regulator systems to a vehicle body. In one exemplary embodiment, improvement to the window regulator system is achieved through the elimination of fasteners for attachment and retention of a pulley to a carrier mounting structure. In this exemplary embodiment, a carrier is formed with a cavity for rotatably receiving a pulley and includes an engagement feature, such as a snap fitting or otherwise, which is configured for limiting movement of the pulley away from the carrier mounting structure.

In another exemplary embodiment, improvement to the window regulator system is achieved through the elimination of fasteners used for assembling the window regulator system. In this exemplary embodiment, attachment of the carrier mounting structure to a guide rail is achieved without the use of fasteners. In this particular configuration it is contemplated that an engagement feature, such as a snap fitting or otherwise, may be formed between the carrier mounting structure and the guide rail for attachment thereof.

In another exemplary embodiment, improvement to the window regulator system is achieved through the integration of the carrier mounting structure with a component of a door. In one configuration, integration of the carrier mounting structure with a component of the door comprises integral formation of one or more of the carrier mounting structures with a panel of a vehicle door assembly. In this exemplary embodiment, the use of fasteners for attachment of the window regulator system to a door or component is reduced because one or more of the components of the window regulator system is formed with the door or component thereof.

It should be appreciated that any of the above referenced advantageous configurations may be combined to form other exemplary embodiments. Further, as shown and described herein, other advantageous exemplary embodiments of the present invention also exist.

Referring to the drawings, exemplary embodiments of a window regulator system 10 are shown. In general, the system includes one or more carrier pulley assemblies 12 attached directly or indirectly to one or more guide rails 14 of the window regulator system. The guide rails include a window attachment 16 for attachment of the guide rails to a window. The carrier pulley systems are attached or formed with a panel 18 of a vehicle door and include a carrier mounting structure 22. The carrier mounting structure receives and supports a pulley 24 configured for receiving and guiding a cable 26. The cable is in driving engagement with a drive motor 28, the pulleys and the window attachments to cause vertical movement of the window.

In operation, activation of the window regulator system is initiated through rotation of drive motor 28. The drive motor is in engagement with cable 26 and moves the cable along the pulleys 24. As the cable is attached to window attachment 16, movement of the cable causes movement of the window through the window attachment. Accordingly, movement of the cable in a first direction may cause the window to rise while movement of the cable in a second direction causes the window to be lowered.

In greater detail, exemplary embodiments of the present invention include carrier mounting structures 22 configured for receiving and providing support to pulley 24. In one particular exemplary embodiment, the carrier mounting structure is also configured to limit or prevent movement of the pulley away from the carrier mounting structure without out the use of fasteners for mounting or limiting movement of the pulley. More so, in one configuration, this limiting movement is achieved through the formation of a fastener-less engagement feature, such as a snap fitting or otherwise, formed by the carrier mounting structure, the pulley or both.

Figure 1:
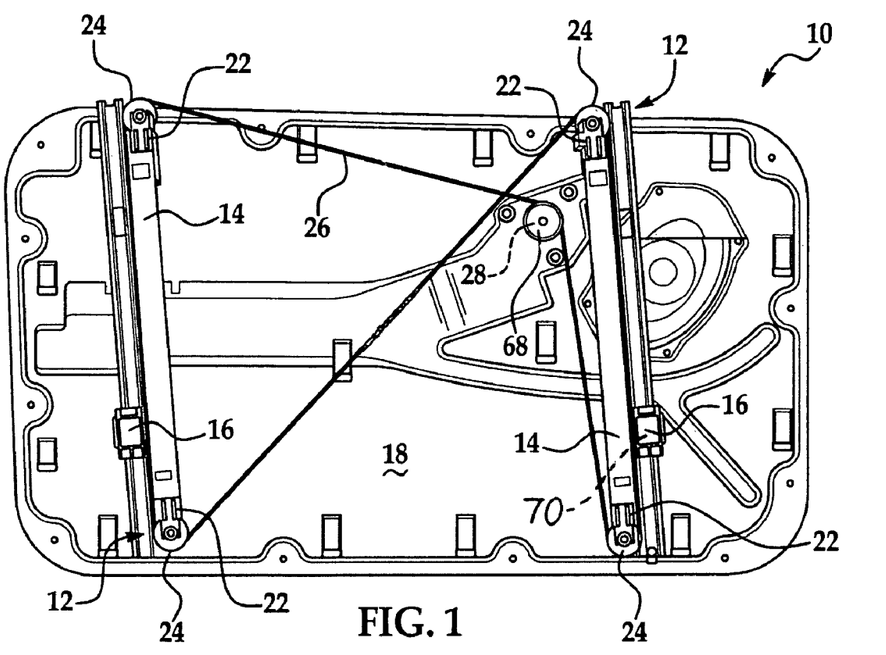
FIG. 1 illustrates an elevational view of a window regulator system in accordance to an exemplary embodiment of the present invention.

The number of carrier mounting structures is based upon the configuration of the window regulator system. For example, it is contemplated that window regulator system 10 may use one or more, or even a plurality, of carrier mounting structures for guiding a cable about the window regulator system. In one particularly exemplary embodiment, as shown in FIG. 1, the window regulator system includes four carrier mounting structures 22 configured for receiving pulley 24 and guiding cable 26. Other configurations should be appreciated such as window regulator systems having two carrier mounting structures or otherwise.

Exemplary embodiments of the carrier mounting structure are configured for receiving and supporting a pulley. In one exemplary embodiment, the pulley is rotatably mounted, attached or otherwise placed within the carrier mounting structure. The rotational mounting of the pulley to the carrier mounting structure may be improved through the use of friction reducing material (e.g. coating, layer or otherwise) on the carrier mounting structure, pulley or both as the use of friction reducing material reduces friction between the carrier mounting structure and pulley.

Figure 6:
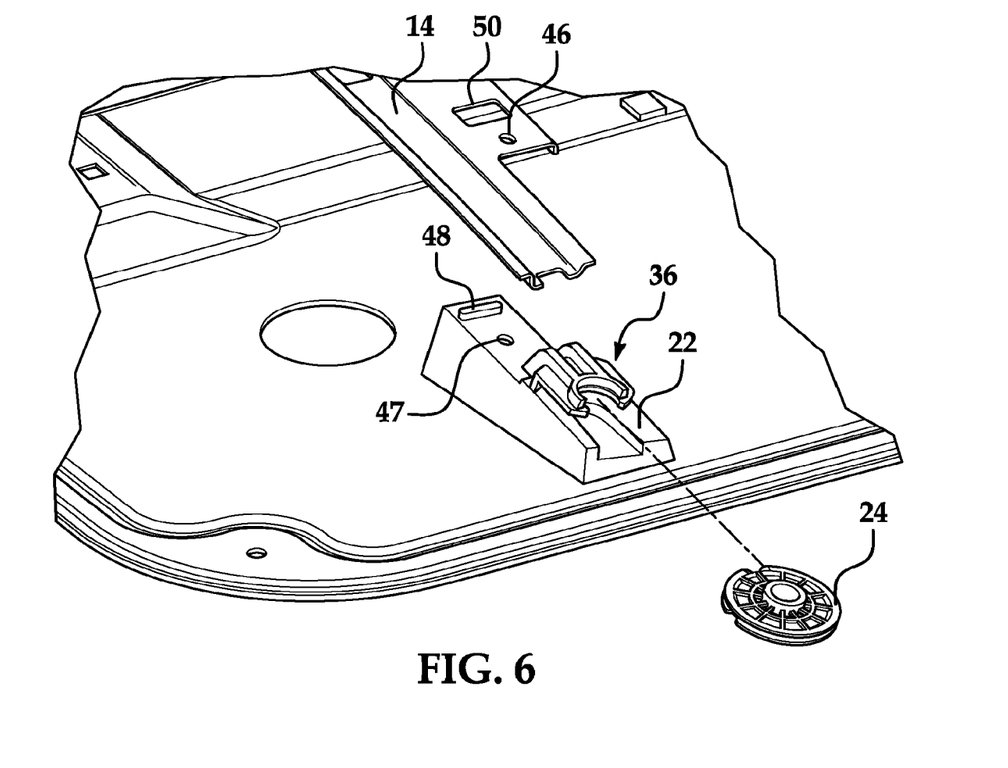
FIG. 6 illustrates an exploded perspective view of the window regulator system shown in FIG. 5.

In one exemplary embodiment, referring to FIG. 6, the carrier mounting structure includes a cavity 30 comprising a slotted portion 32 for receiving and supporting pulley 24. In one configuration, the slotted portion may comprise an elongated opening formed through one or more portions of the carrier mounting structure. In another configuration, the slotted portion comprises an arcuate recessed portion formed through one or more portions of the carrier mounting structure. In any of the configurations, it is contemplated that at least a portion of the cavity has a corresponding shape and size to a portion of the pulley received thereby.

The carrier mounting structure further includes, or otherwise forms, at least a portion of an engagement feature 36 for maintaining the pulley within the cavity. In one exemplary embodiment, the engagement feature is free of fasteners for maintaining the pulley within the cavity of the carrier mounting structure. In this configuration, the engagement feature includes one or more elastically deformable members configured to elastically bend in order to receive the pulley within the cavity of the carrier mounting structure. As an example, in one configuration the engagement feature comprises a snap fitting, or the like.

In one exemplary embodiment, the engagement feature is integrally formed with the carrier mounting structure to form a unitary structure. In this configuration, the engagement feature is simultaneously formed with other components of the carrier mounting structure to form substantially continuous material. However, other methods or configurations may be used to form the integral structure. In another configuration, the engagement feature comprises a separate component attached to the carrier mounting structure. In this configuration the engagement feature may comprise a separately formed component attached to the carrier mounting structure, pulley, or both, to form the engagement feature.

As an example of the above referenced engagement features, in one exemplary embodiment, referring to FIGS. 4-9 and 11, carrier mounting structure 22 includes opposing tabs 38 that are configured to engage a portion of pulley 24 to prevent or resist movement of the pulley from cavity 30. The tabs are spaced apart at a distance less than a diameter the pulley being received by the cavity such that during insertion of the pulley into the cavity, the tabs, or portions of the carrier member, elastically bend outwards to allow the pulley to be received into the cavity. Once received with the cavity, the tabs return to their original position to limit movement of the pulley from the cavity. Once within the cavity, friction force between the carrier mounting structure and more specifically the tabs and the pulley prevent or limit movement of the pulley away from the carrier mounting structure. In one configuration, the engagement feature is suitable in strength to support the pulley within the cavity during application of the pulleys weight against the engagement feature. However, it is also contemplated that the engagement feature may be configured to maintain the pulley within the cavity during normal operating use of the window regulator system.

Figures 11, 12, 13:
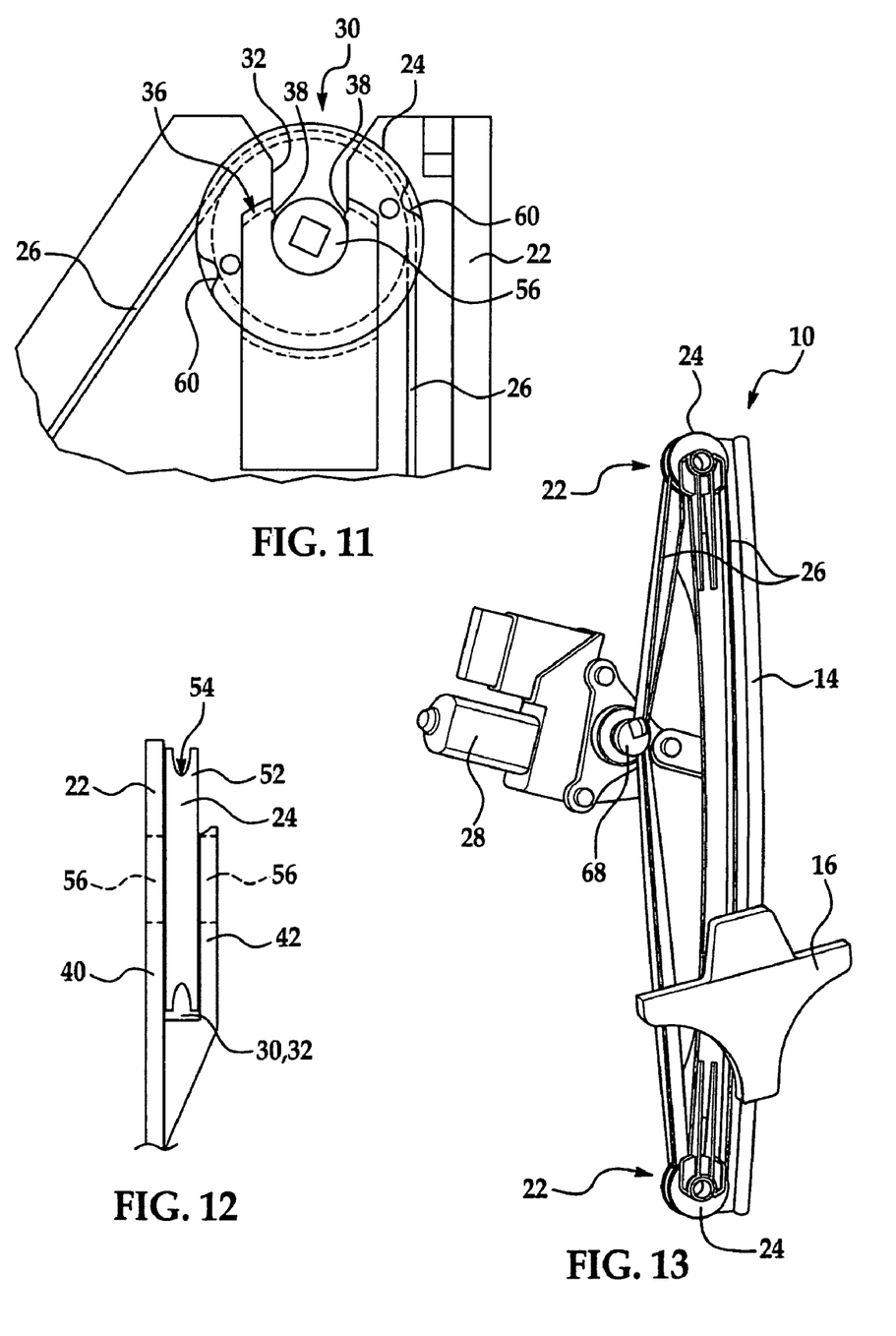
FIG. 11 illustrates a front view of a carrier mounting structure according to one exemplary embodiment of the present invention.
FIG. 12 illustrates a side view of a carrier mounting structure shown in FIG. 11.
FIG. 13 illustrates a perspective view of another window regulator system according to an exemplary embodiment of the present invention.
Figures 14, 15:
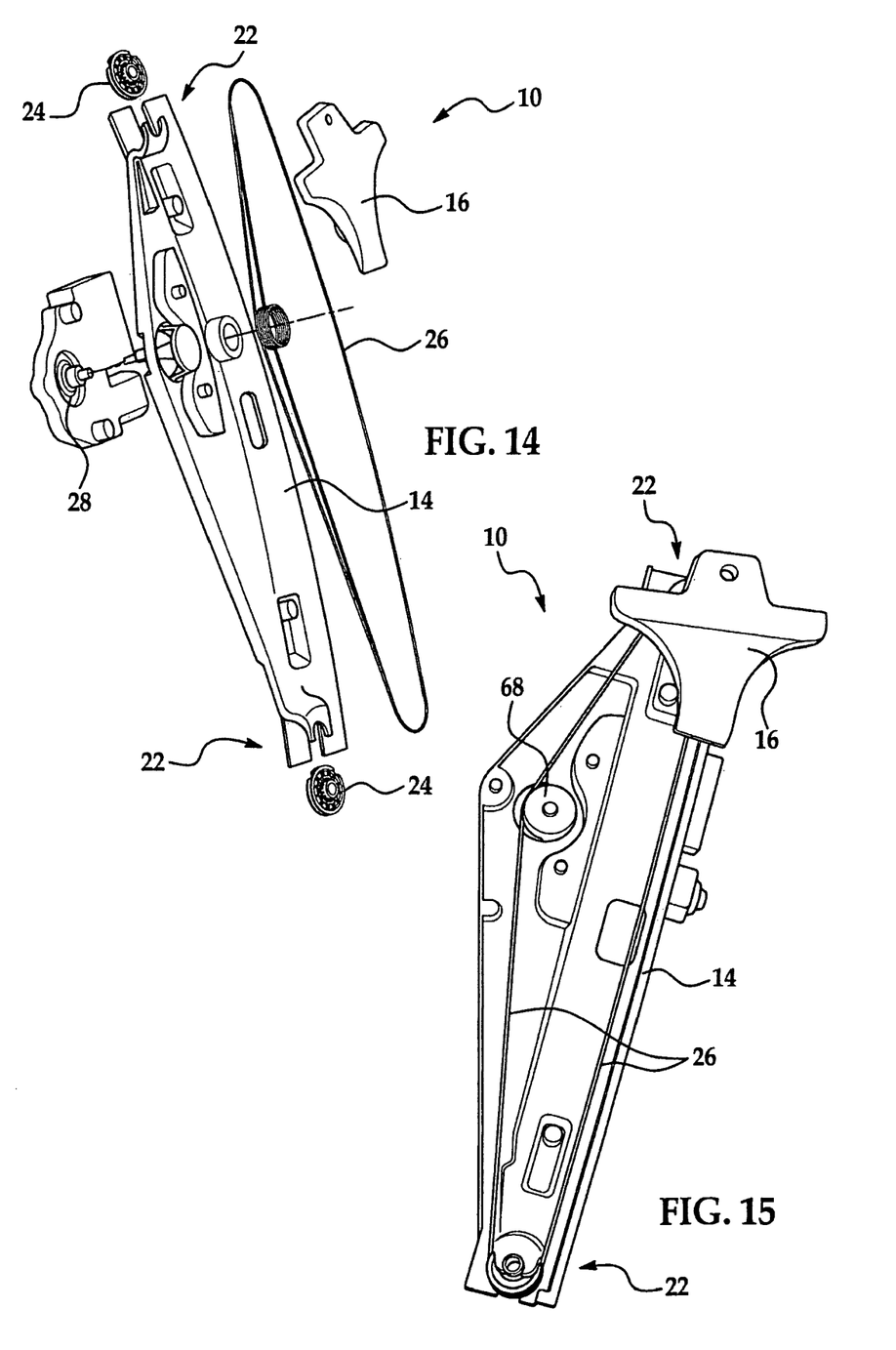
FIG. 14 illustrates an exploded perspective view of yet another window regulator system according to an exemplary embodiment of the present invention.
FIG. 15 illustrates an assembled perspective view of the window regulator system shown in FIG. 14.
Figure 16:
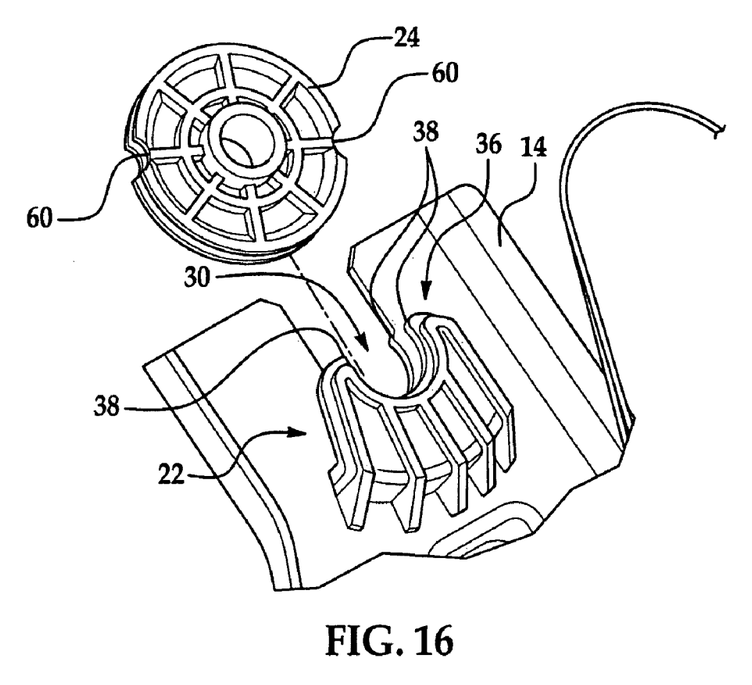
FIG. 16 illustrates an enlarged view of a portion of the window regulator system shown in FIG. 14.
Figure 17:
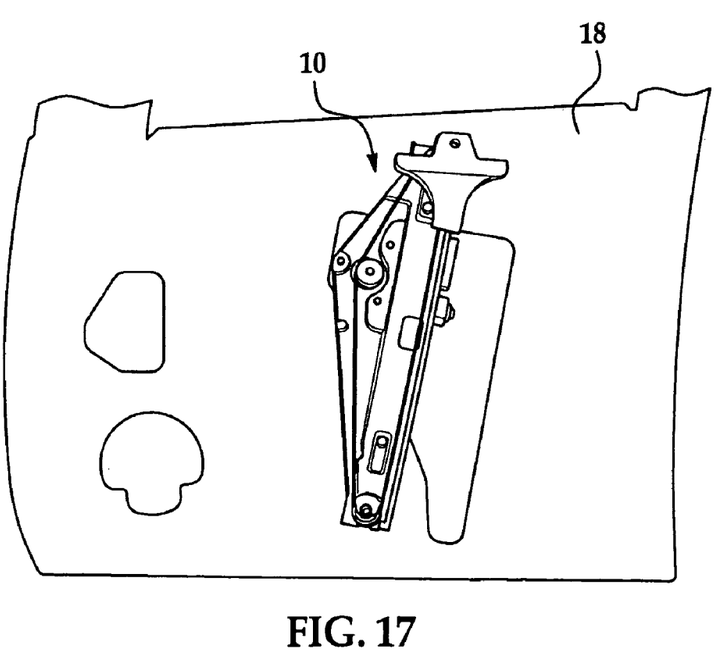
FIG. 17 illustrates the window regulator system shown in FIG. 14 installed onto a door panel according to an exemplary embodiment of the present invention.

In one exemplary embodiment, with reference to FIGS. 11 and 12, the carrier mounting structure includes a base portion 40 and an extension 42. The extension is connected to, but spaced apart from, from the base portion 40 at a distance generally equal to or slightly larger than a thickness of the pulley. In this configuration, internal surfaces of the base portion and extension act to assist in the stabilization of the pulley during rotation. Further, in this configuration, the base portion and extension each form a portion of the cavity extending through the carrier mounting structure.

The engagement feature may be formed on the base portion, extension or otherwise. In one exemplary embodiment, as particularly shown in FIG. 8, the engagement feature is formed on the extension and configured to engage a portion of the pulley residing in the cavity 30 formed through the extension.

The carrier mounting structure may be further configured for direct engagement and/or attachment with a guide rail. For example, with reference to FIGS. 3-6, carrier mounting structure 22 includes a rail engagement feature 44 for engagement with guide rail 14. In one exemplary embodiment, the rail engagement feature includes a corresponding shape to a portion of the guide rail for providing engagement between the guide rail and carrier mounting structure. In another exemplary embodiment, the rail engagement feature also includes one or more attachments for maintaining engagement of the guide rail and the carrier mounting structure. In one configuration, the attachment feature comprises a fastener such as a bolt, screw, adhesive, weld, or otherwise. In another configuration, the attachment feature comprises an engagement feature which does not require the used of fasteners for attachment of the carrier mounting structure and the guide rail. In one configuration, the engagement feature comprises a snap fitting, or the like. This is further discussed, herein, with reference to the guide rail.

Alternatively, the carrier mounting structure may be configured for indirect engagement and/or attachment with a guide rail. For example, with reference to FIGS. 7 and 8, the guide rail may be attached directly to a door panel as opposed to the carrier mounting structure. In the configuration shown, the carrier mounting structure is also attached to the door panel and more particularly integrally formed with the door panel. Also, this configuration may include any of the engagement features or configurations as the carrier mounting structure and guide rail attachment discussed above.

Figure 2:
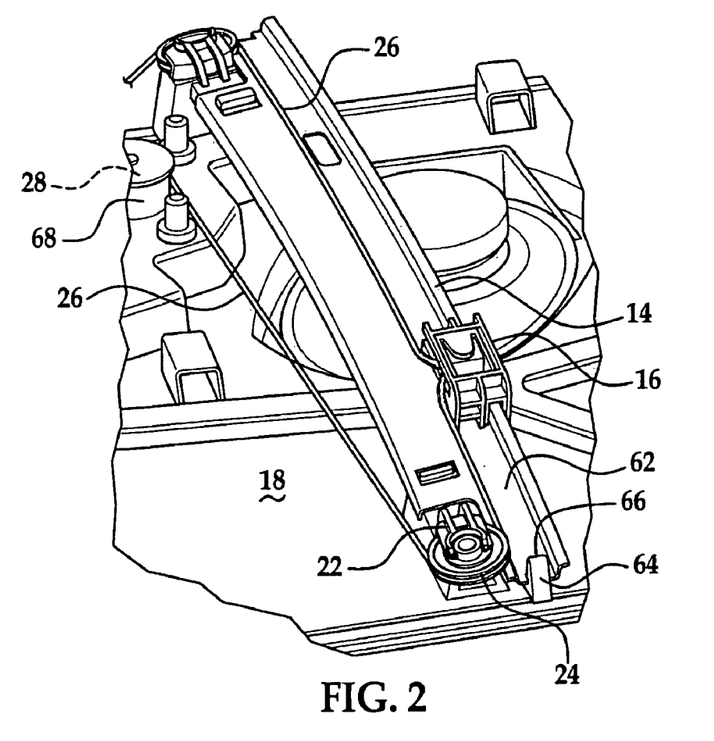
FIG. 2 illustrates a perspective view of a portion of the window regulator system shown in FIG. 1.
Figure 3:
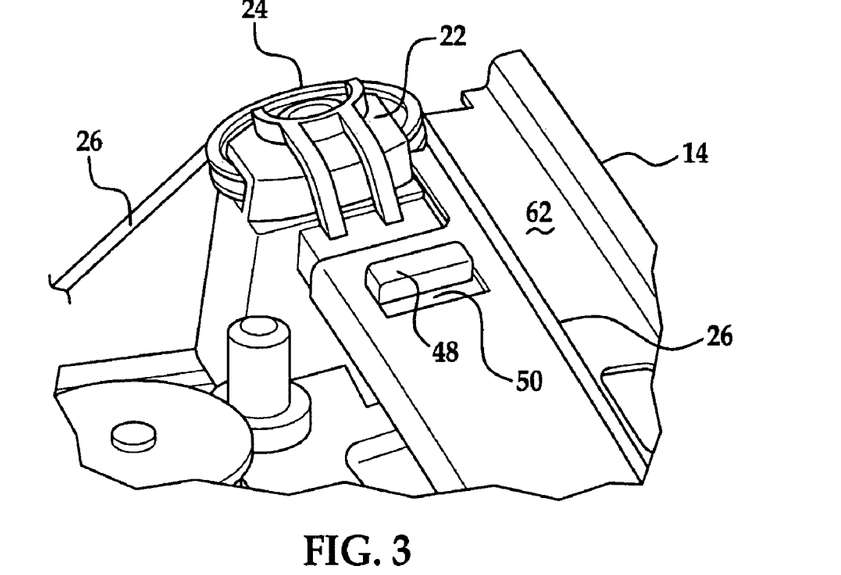
FIG. 3 illustrates an enlarged view of a portion of the window regulator system shown in FIG. 2.
Figure 8:
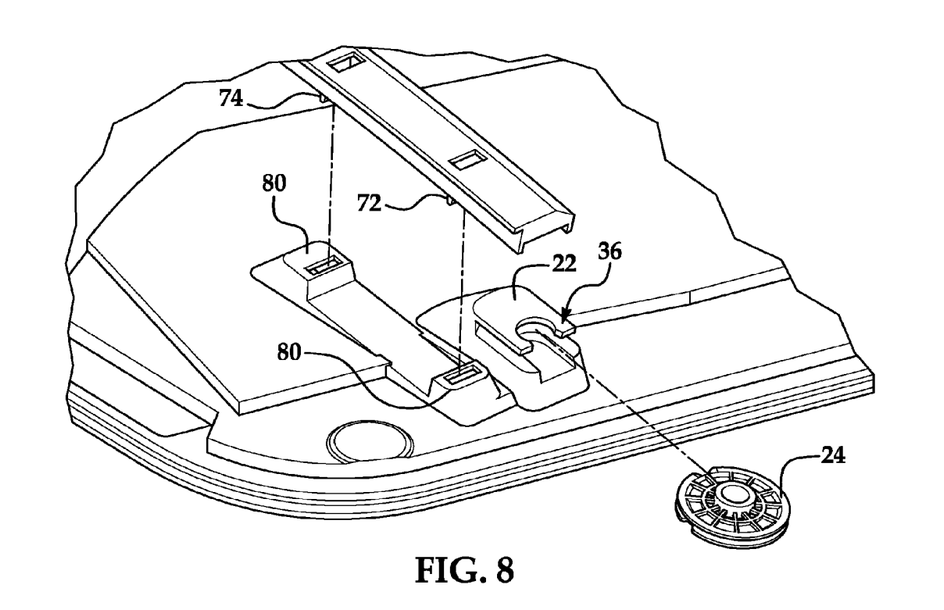
FIG. 8 illustrates an exploded perspective view of the window regulator system shown in FIG. 7.
Figure 9:
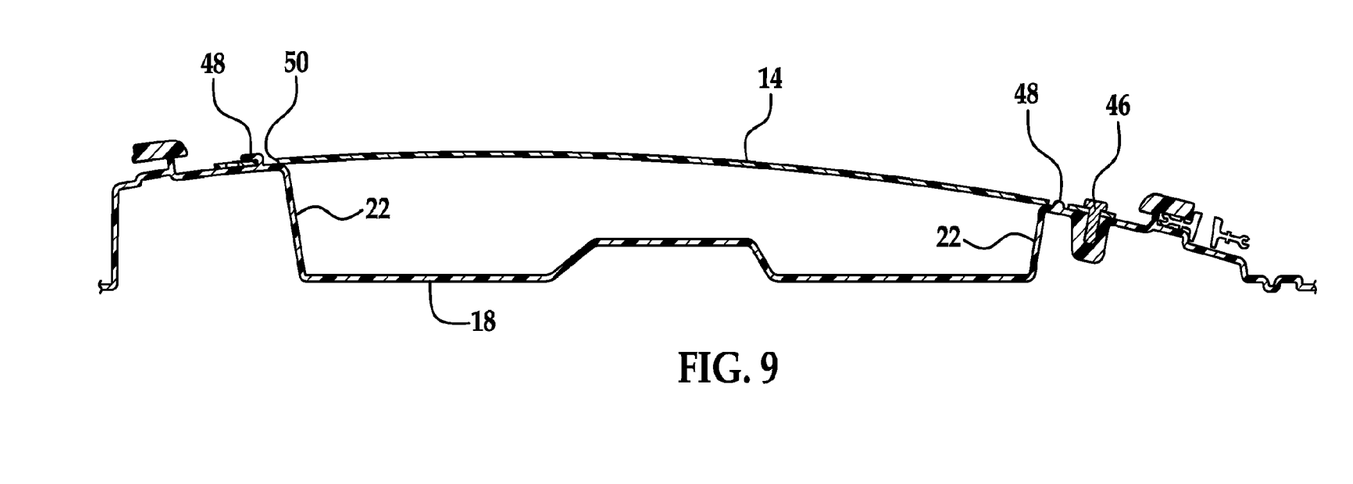
FIG. 9 illustrates a cross-sectional view of a window regulator system according to an exemplary embodiment of the present invention.
Figure 10:
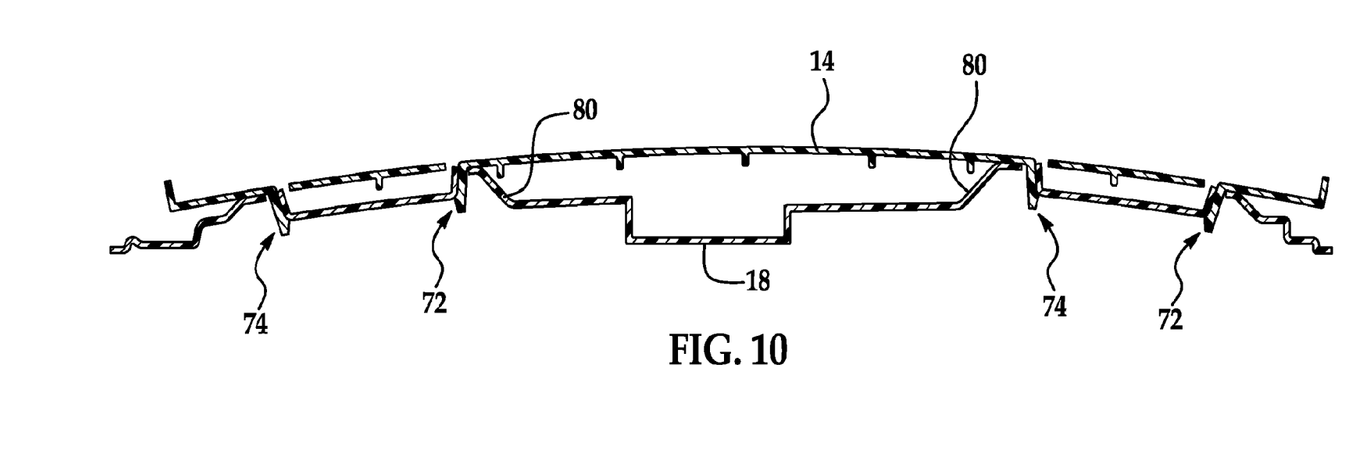
FIG. 10 illustrates a cross-sectional view of another window regulator system according to an exemplary embodiment of the present invention.

The carrier mounting structure may be formed using any suitable forming process. In one exemplary embodiment, the carrier mounting structure is formed through a stamping process. In another exemplary embodiment, the carrier mounting structure is formed through a molding process. With respect to molding, the carrier mounting structure may be molded alone or in conjunction with one or more additional components. For example, the carrier mounting structure may be molded with the one or more engagement features, rail and/or other component. In one particular exemplary embodiment, as shown in FIGS. 2, 6 and 8, the carrier mounting structure may be molded with panel 18 to form a unitary structure of a door panel. In this configuration, the panel may have a corresponding shape to the door in which it is attached to.

The carrier mounting structure may be formed using any suitable material. For example, it is contemplated that the carrier mounting structure may be formed of metal, plastic, rubber, composite, or otherwise. In one exemplary embodiment, the material forming the carrier mounting structure corresponds to the forming process thereof. For example, a stamping process may use a metal material while a molding process may use a metal, plastic or other material. Also, the material of the carrier mounting structure may include reinforcement material, embedded therein, for improving strength, or otherwise, of the carrier mounting structure. In one particular exemplary embodiment, the material forming the carrier mounting structure comprises glass fiber polypropylene. In another exemplary embodiment, the material forming the carrier mounting structure comprises a steel, such as stainless steel or otherwise.

The window regulator system includes one or more pulleys for supporting and guiding the cable about the window regulator system. It should be appreciated that the number of pulleys of the window regulator system corresponds with the number of carrier mounting structures. The pulleys of the carrier pulley assembly are configured to matingly engage with the carrier mounting structure, as previously described. The pulleys are also configured to be rotatably supported within the cavity of the carrier mounting structure.

Figure 4:
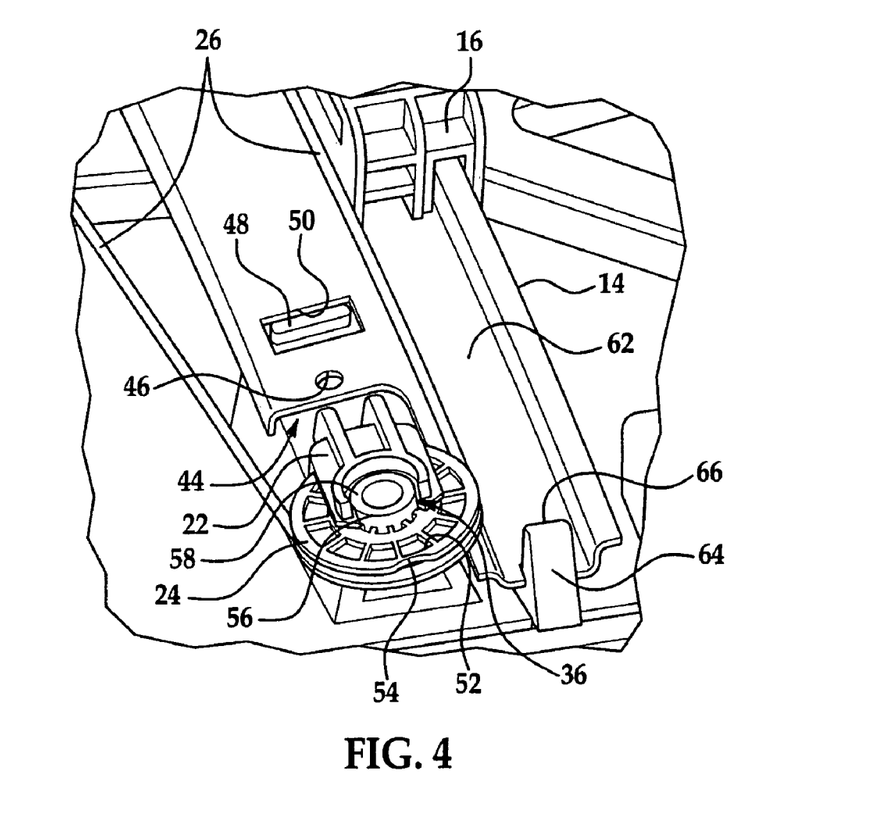
FIG. 4 illustrates another enlarged view of a portion of the window regulator system shown in FIG. 2.
Figure 5:
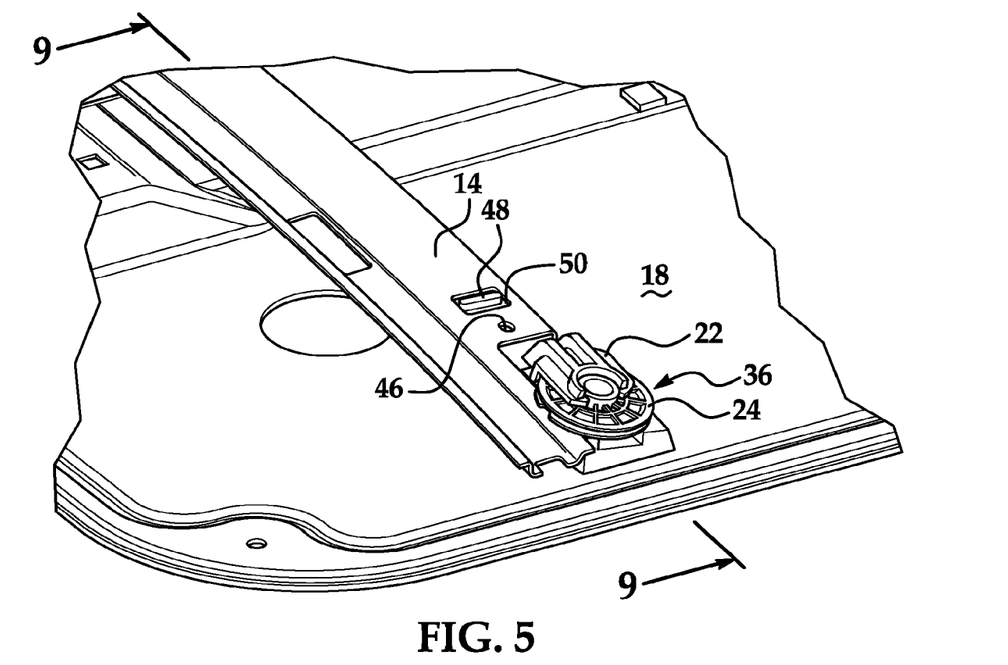
FIG. 5 illustrates a perspective view of a window regulator system according to an exemplary embodiment of the present invention.

In one exemplary embodiment, referring to FIGS. 11 and 12, the pulley comprises a central disk 52 forming groove 54 extending about a periphery of the central disk. The groove is configured for receiving and guiding cable 26. Extending from opposite sides of the central disc are two oppositely located cylindrical members 56 optionally having an annular flange 58 located at the end of the cylindrical members. The cylindrical members 56 include an exterior diameter corresponding to an interior diameter formed by cavity 30 extending through base portion 40 and extension 42 of the carrier mounting structure. It is contemplated that the cylindrical members may be formed of, or include, a friction reducing material, as previously described. Optionally, as shown in FIG. 4, the annular flange 58 may be configured to engage a portion of the base portion and/or extension of the carrier mounting structure to prevent or limit axial movement of the pulley. Optionally, the central disk portion includes an installation feature for placement of the cable within groove 54. For example, the installation feature may comprise one or more notches 60 for feeding a portion of the cable into the groove, whereby, upon rotation of the pulley the cable is feed into groove 54.

The pulley may be formed through any suitable forming process. In one exemplary embodiment, the pulley is formed through a molding process. Similarly, the pulley may be formed with any suitable material. For example, in one configuration the pulley is formed of metal, plastic, rubber, composite, or otherwise. In one particular exemplary embodiment, the pulley is formed of plastic.

The window regulator system also includes one or more guide rails 14 slidably engaged with window attachment for aiding in the movement of a window. In one exemplary embodiment, guide rails 14 are attached the carrier mounting structure 22 and include corresponding engagement features to that of engagement feature 44 of the carrier mounting structure. As previously mentioned, this attachment may be through the use of fasteners or may be fastener free, e.g., snap-fitting or otherwise. However, in one exemplary embodiment, it is also contemplated that the guide rail may be integrally formed with the carrier mounting structures to form a unitary structure.

In one exemplary embodiment, the guide rails are mounted to a rigid structure of the vehicle door to provide support for the window. In one particular exemplary embodiment, the guide rails are mounted directly to a panel of a door or other door structure, such as when the guide rails are integrally formed with the carrier mounting structure or the guide rails are attached to carrier mounting structures integrally formed with the panel, or otherwise. In another exemplary embodiment, the guide rails are mounted to a panel of a door through another component such as where the guide rails are attached to separately formed carrier mounting structures and the carrier mounting structures are attached to the panel. Optionally, as described further herein, one or more supports may be used to provide support to a guide rail. For example, at times it may be desirable to provide support to lighter weight more flexible guide rails, such as certain guide rails formed of plastic or otherwise. It should be appreciated that other configurations are contemplated.

In view of the foregoing, with reference to FIGS. 2-6, one exemplary embodiment of a guide rail 14 is shown. The guide rail includes a first end configured for engagement with a first carrier mounting structure 22 and a second end configured for engagement with a second carrier mounting structure 22. Attachment of the first end and the second end of the guide rail to the first carrier mounting structure and the second carrier mounting structure are facilitated through locating features 48 extending from the first carrier mounting structure 22 and extending through openings 50 formed through the guide rail 14. In the configuration shown, one end of the guide rail engages a straight locating feature 48 while the other end of the guide rail engages a hooked locating feature 48. The hooked locating feature is configured to engage a portion of the guide rail forming the opening for preventing movement along a length of the guide rail. The hooked locating feature is further configured with a corresponding (e.g., substantially similar) width to that of the opening to prevent lateral movement of the hooked locating feature with respect to the opening.

The second end of the guide rail includes an opening 46 for receiving a fastener configured to engage door panel 18, or another component, to limit or prevent movement of the guide rail away from the door panel and/or away from the second carrier mounting structure 22. In this configuration, in order to align opening 46 with an opening of the door panel or other component, the hooked locating feature 48 must enter opening 50 and move with respect to the opening to engage the guide rail. Once the fastener engages opening 46, the hooked locating feature substantially limits the first end of the guide rail from moving with respect to the first carrier mounting structure.

Figure 7:
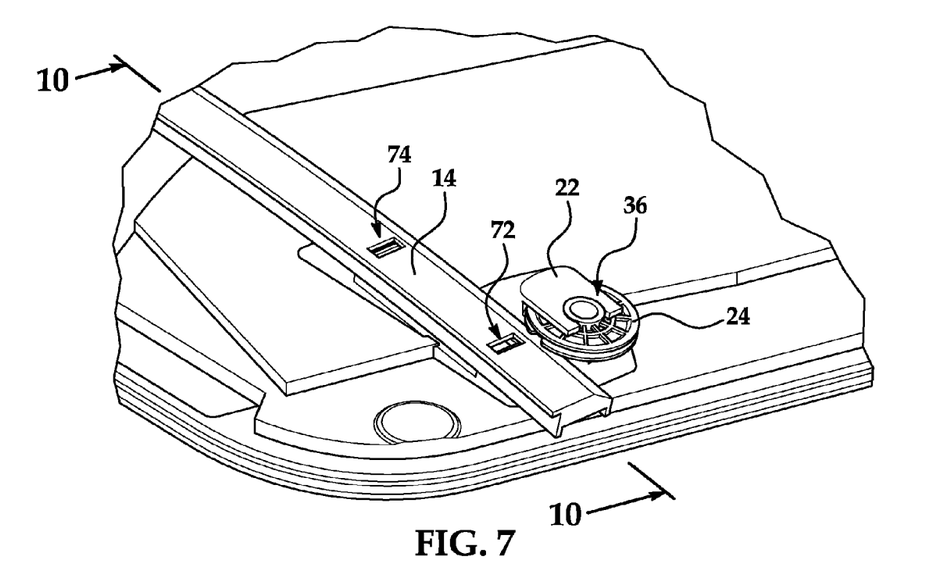
FIG. 7 illustrates a perspective view of another window regulator system according to an exemplary embodiment of the present invention.

With reference to FIGS. 7 and 8, another exemplary embodiment of a guide rail is shown. In this configuration, the guide rail includes a first end and a second end each configured for direct engagement to door panel 18. Engagement of the first end and second end with the door panel is achieved through a first snap fitting 72 and a second snap fitting 74. In this configuration, as the guide rail is joined with the door panel, corresponding snap fitting components of the guide rail and door panel engage to substantially limit or prevent movement of the guide rail with respect to the door panel.

In this configuration, one or more support members 80 extend between the guide rail and the door panel for providing support to the guide rail. In one particular configuration, the support members are integrally formed with the door panel to form a unitary structure. In another particularly configuration, the supports are integrally formed with the guide rail to form a unitary structure. In either configuration, optionally one or more additional snap fittings may be formed between the support members 80 and the guide rail for substantially limiting or preventing movement of the guide rail away from the support members and/or door panel.

In one exemplary embodiment, as shown in FIGS. 2 and 4, the guide rails include a track 62 for receiving and guiding the window attachment. The track includes at least one cross-sectional profile extending along a length of the track that corresponds to a shape of the window attachment feature. This corresponding shape not only provides guidance for the window attachment, but also, in one exemplary embodiment, limits movement of the window attachment away form the track. Optionally, located at one or more ends of the track, a stop 64 may be formed or located to limit movement of the window attachment along the length of the track. Suitable examples of stops can be found in commonly owned U.S. Pat. No. 7,246,465, the contents of which are incorporated herein by reference thereto for all purposes. In one exemplary embodiment, the stop further includes a buffer 66 for cushioning potential impact between the carrier mounting structure and the stop.

The window attachment 16 is configured for supporting the window and providing movement of the window along the guide rail. As mentioned above, the window attachment may include a corresponding shape to at least a portion of the track. The window attachment includes window attachment and/or support feature for engagement with the window. In one configuration, the window attachment comprises a guide block and includes mechanical fasteners for engaging the window attachment and window.

The tracks may be formed through any suitable forming process. In one exemplary embodiment, the track is formed through a molding process. In another exemplary embodiment, the track may be formed through a stamping process. Similarly, the track may be formed with any suitable material. For example, in one exemplary embodiment the track is formed of metal, plastic, rubber, composite, or otherwise. In one particular exemplary embodiment, the tracks are formed of plastic. In another particular exemplary embodiment, the tracks are formed of steel.

In one exemplary embodiment, the window regulator system includes or is attached to a door panel for providing support to one or more components of the window regulator system. The door panel is suitable in strength to support various component of the window regulator system and vehicle door. In one configuration, the panel includes a shape generally corresponding to a shape of the door in which it is attached. Typically, the door panel is attached to a structural member of the door, such as a door frame, through a plurality of fasteners, adhesives, welding, combinations thereof or otherwise.

As previously mentioned, in one exemplary embodiment the panel is integrally formed with one or more components of the window regulator system. For example, with reference to FIG. 4, the panel may be formed with the carrier mounting structure to form a unitary structure. In another exemplary embodiment the panel may be formed with the stop to form a unitary structure. In still another exemplary embodiment, the panel may form a portion of the engagement feature of the carrier mounting structure. Also, the door panel may include one or more supports for the window regulator system.

The panel may be formed of any suitable material for supporting components of the window regulator system, door or otherwise. Examples of suitable material include plastic, rubber, metal, composite, combinations thereof or otherwise. In one exemplary embodiment, the panel is formed of the same material as the carrier mounting structure, stop or other integrally formed component. Optionally, the material forming the carrier may include a reinforcement material for improving strength of the panel. For example, in one particular exemplary embodiment, the panel is formed of glass fiber polypropylene.

The window regulator system further includes drive motor 28 suitable in power for movement of a window. In one exemplary embodiment, the drive motor includes a rotatable grooved drum 68 configured for engagement with cable 26. In one exemplary embodiment, during actuation of the motor the motor rotates drum 68 in a first direction to cause movement of the window upwards and rotates drum 68 in a second direction to cause movement of the window downwards. In one exemplary embodiment, the motor is attached to the vehicle door, panel or window regulator system as necessary, based upon the configuration of the vehicle door. For example, as shown in FIGS. 1 and 2, the motor may be attached to panel 18 through suitable attachment means.

The cable of the window regulator system is configured for driving engagement with drive motor 28 and is attached to window attachment 16. As previously discussed, cable 26 is in further engagement with pulleys 24 of the carrier pulley systems. In one exemplary embodiment, the cable includes a spring 70 for maintaining relatively constant tension against the grooved drum of the drive motor and the pulleys. This constant pressure may be used to assist in maintaining the pulley in the cavity of the carrier mounting structure. The spring may comprise any suitable cable tensioning spring.

In view of the foregoing, with reference to FIGS. 1-8, several exemplary embodiments of a first configuration of a window regulator system and carrier pulley system of the present invention are shown. In the exemplary embodiments shown, the window regulator systems include first and second guide rails 14, which are located on opposite sides of panel 18. The first and second guide rails include or are associated with carrier mounting structures 22 located on opposite sides of the guide rails. The carrier mounting structures include pulleys 24 received within cavity 30 of the carrier mounting structures and held in place through engagement features 36. The carrier mounting structures are integrally formed with the panel to form a unitary structure.

The window regulator system further includes drive motor 28 having rotatable grooved drum 68 in driving engagement with cable 26. The cable engages window attachments 16 and is supported at the ends of guide rails 14 through pulleys 24. Upon actuation of the drive motor, the cable moves the window attachments to cause an upward or downward movement of an attached window. Movement of the window attachments is limited through stop 64. Optionally, tension is maintained between the cable, the drum and pulleys through spring 70 and the pulleys include notch 60 for insertion of the cable within the grooved portion of the pulleys, during installation.

In view of the foregoing, with reference to FIGS. 13-17, several exemplary embodiments of a second configuration of a window regulator system and carrier pulley system of the present invention are shown, wherein the embodiment of FIG. 13 comprises a more streamlined lighter weight version of the configuration shown in FIGS. 14-17. In the exemplary embodiments shown, the window regulator systems include a single guide rail 14 configured for attachment to a panel 18 of a vehicle door. The guide rail is integrally formed with two carrier mounting structures 22 located on opposite sides of the guide rail. The carrier mounting structures include pulleys 24 received within cavity 30 of the carrier mounting structures and held in place through engagement features 36, including tabs 38. The guide rail and carrier mounting structures are attached to the panel of the vehicle door through a suitable attachment, such as fasteners or otherwise.

The window regulator system further includes drive motor 28 having rotatable grooved drum 68 in driving engagement with cable 26. The cable engages window attachments 16 and is supported at the ends of guide rail 14 through pulleys 24. Upon actuation of the drive motor, the cable moves the window attachments to cause an upward or downward movement of an attached window. Optionally, tension is maintained between the cable, the drum and pulleys through a spring and the pulleys include notch 60 for insertion of the cable within the grooved portion of the pulleys, during installation.

Exemplary embodiments of the present invention further provide methods of forming a mounting structure for a window regulator system and/or actuation of the window. The method may include any of the features described herein.

In one exemplary embodiment, the method includes inserting a first pulley 24 into a first slotted portion 32 of a first carrier mounting structure 22 and inserting a second pulley 24 into a second slotted portion 32 of a second carrier mounting structure 22. The first and second slotted portions include a snap fit engagement feature 36 for resisting movement of the first and second pulleys away from the first and second mounting structures. The first and second carrier mounting structures are attached to a first guide rail 14, through a snap fit engagement feature, wherein at least one of the first or second carrier mounting structure or the first guide rail is attached or otherwise integrally formed to a door panel 18 of a vehicle door.

The method further includes attachment of a cable 26 to the first and second pulleys located at the ends of the first and second carrier mounting structures and to a drive motor 28 of the window regulator system. The cable is attached to a first window attachment 16, which is in sliding engagement with the first guide rail. Optionally, the cable includes a spring 70 for providing tension to the cable upon installation and the pulleys include one or more notches 60 for facilitating in placement of the cable into a grooved portion 54 of the pulley.

Optionally, the method further includes the steps of inserting a third pulley 24 into a third slotted portion 32 of a third carrier mounting structure 22 and inserting a fourth pulley 24 into a fourth slotted portion 32 of a fourth carrier mounting structure 22. The third and fourth slotted portions include a snap fit engagement feature 36 for resisting movement of the third and fourth pulleys away from the third and fourth carrier mounting structures, respectively. The third and fourth mounting structures are attached to a second guide rail 14, wherein at least one of the third and fourth mounting structures or the second guide rail is attached to the door panel of the vehicle door. The method further includes attachment of the cable to the third and fourth pulleys located at the ends of the third and fourth carrier mounting structures. The cable is further attached to a second window attachment 16, which is in sliding engagement with the second guide rail.

The window regulator system and carrier pulley system can be used in numerous applications requiring movement, e.g., vertical or otherwise, of a panel like member, such as a window. In one exemplary embodiment, the systems of the present invention are used for attachment and movement of a window and in one particular exemplary embodiment, a vehicle window. In this application, the window regulator system and carrier pulley system can be used for driver or passenger side windows. The systems may also be used in rear windows located on a rear portion of a vehicle, such as a back hatch or otherwise. Still further, the systems may be used on other vehicle windows including, without limitation, overhead sunroofs or otherwise. Other vehicle and non-vehicle applications are contemplated.

While exemplary embodiments have been described and shown, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A mounting structure, comprising:
a main body portion defining a cavity for rotatably receiving a shaft portion of a pulley therein; and
a resilient engagement feature integrally formed with the main body portion, the resilient engagement feature extending from the main body into the cavity, the resilient engagement feature being configured to be deflected from a first position in a first direction when the shaft portion of the pulley is inserted into the cavity in the first direction and the resilient engagement feature returns to the first position when the shaft portion is fully inserted into the cavity and the resilient engagement feature is configured to prevent the shaft portion of the pulley from being removed from the cavity, wherein the engagement feature of the mounting structure is the only item that prevents the shaft portion of the pulley from being removed from the cavity once the shaft portion of the pulley is fully inserted into the cavity, and wherein the mounting structure is integrally formed with a panel of a window regulator system.

2. The mounting structure of claim 1, wherein the engagement feature comprises two inwardly facing tabs, each of the tabs having a distal end spaced apart from each other a first distance across the cavity, wherein the first distance is less than a diameter of the shaft portion of the pulley.

3. The mounting structure of claim 2, wherein the mounting structure and the pulley are formed of a plastic material.

4. The mounting structure of claim 3, wherein the mounting structure further comprises a rail engagement feature configured to engage an opening of a guide rail of the window regulator system, when the guide rail is secured to the mounting structure.

5. A mounting assembly for a window regulator system, comprising:
a first mounting structure integrally formed with a panel of the window regulator system, the first mounting structure having a first slotted portion and a first engagement feature located above the first slotted portion, the first engagement feature having a cavity for rotatably receiving a shaft portion of a pulley therein; and a resilient engagement feature integrally formed with the first engagement feature, the resilient engagement feature extending from the first engagement feature into the cavity, the resilient engagement feature being configured to be deflected from a first position in a first direction when the shaft portion of the pulley is inserted into the cavity in the first direction and the resilient engagement feature returns to the first position when the shaft portion is fully inserted into the cavity and the resilient engagement feature is configured to prevent the shaft portion of the pulley from being removed from the cavity, wherein the engagement feature of the mounting structure is the only item that prevents the shaft portion of the pulley from being removed from the cavity once the shaft portion of the pulley is fully inserted into the cavity and wherein a portion of the shaft portion is also rotatably received within the first slotted portion;

a second mounting structure integrally formed with the panel of the window regulator system, the second mounting structure having a second slotted portion and a second engagement feature located above the second slotted portion, the second engagement feature having a cavity for rotatably receiving a shaft portion of another pulley therein; and a resilient engagement feature integrally formed with the second engagement feature, the resilient engagement feature extending from the second engagement feature into the cavity, the resilient engagement feature being configured to be deflected from a first position in a first direction when the shaft portion of the another pulley is inserted into the cavity in the first direction and the resilient engagement feature returns to the first position when the shaft portion is fully inserted into the cavity and the resilient engagement feature is configured to prevent the shaft portion of the another pulley from being removed from the cavity, wherein the second engagement feature of the mounting structure is the only item that prevents the shaft portion of the pulley from being removed from the cavity once the shaft portion of the another pulley is fully inserted into the cavity and wherein a portion of the shaft portion is also rotatably received within the second slotted portion; and a first guide rail extending between the first mounting structure and the second mounting structure, the first guide rail including a first window attachment slidably attached thereto, the first window attachment being drivably attached to a cable which is adapted for engagement with the first and second pulleys.

6. The mounting assembly of claim 5, wherein the first mounting structure and the second mounting structure are formed of a glass fiber polypropylene material.

7. The mounting assembly of claim 5, wherein the first mounting structure or the second mounting structure comprises a rail engagement feature configured to engage an opening of a guide rail of the window regulator system, when the guide rail is secured to either the first mounting structure or the second mounting structure.

8. The mounting assembly of claim 5, further comprising:

a third mounting structure integrally formed with the panel of the window regulator system, the third mounting structure having a third slotted portion and a third engagement feature located above the third slotted portion, the third engagement feature having a cavity for rotatably receiving a shaft portion of a third pulley therein; and a resilient engagement feature integrally formed with the third engagement feature, the resilient engagement feature extending from the third engagement feature into the cavity, the resilient engagement feature being configured to be deflected from a first position in a first direction when the shaft portion of the third pulley is inserted into the cavity in the first direction and the resilient engagement feature returns to the first position when the shaft portion of the third pulley is fully inserted into the cavity and the resilient engagement feature is configured to prevent the shaft portion of the third pulley from being removed from the cavity, wherein the engagement feature of the mounting structure is the only item that prevents the shaft portion of the third pulley from being removed from the cavity once the shaft portion of the third pulley is fully inserted into the cavity and wherein a portion of the shaft portion is also rotatably received within the third slotted portion;

a fourth mounting structure integrally formed with the panel of the window regulator system, the fourth mounting structure having a fourth slotted portion and a fourth engagement feature located above the fourth slotted portion, the fourth engagement feature having a cavity for rotatably receiving a shaft portion of another pulley therein; and a resilient engagement feature integrally formed with the fourth engagement feature, the resilient engagement feature extending from the fourth engagement feature into the cavity, the resilient engagement feature being configured to be deflected from a first position in a first direction when the shaft portion of the another pulley is inserted into the cavity in the first direction and the resilient engagement feature returns to the first position when the shaft portion is fully inserted into the cavity and the resilient engagement feature is configured to prevent the shaft portion of the another pulley from being removed from the cavity, wherein the fourth engagement feature of the mounting structure is the only item that prevents the shaft portion of the pulley from being removed from the cavity once the shaft portion of the another pulley is fully inserted into the cavity and wherein a portion of the shaft portion is also rotatably received within the fourth slotted portion; and a second guide rail extending between the second mounting structure and the third mounting structure, the second guide rail including a second window attachment slidably attached thereto, the second window attachment being drivably attached to a cable which is adapted for engagement with the second and third pulleys.

9. The mounting assembly as in claim 5, wherein the resilient engagement feature of the first engagement feature and the second engagement feature each comprises a pair of inwardly facing tabs each having a distal end spaced apart from each other a first distance, wherein the first distance is less than a diameter of the shaft portion of the pulley inserted into the cavity.

10. The mounting assembly as in claim 9, wherein the first mounting structure, the pulley, the second mounting structure and the another pulley are formed of a plastic material.

11. The mounting assembly as in claim 10, wherein the first mounting structure and the second mounting structure each further comprises a rail engagement feature configured to engage an opening of a guide rail of the window regulator system, when the guide rail is secured to the first mounting structure and the second mounting structure.

* * * * *